United States Patent [19]
Aymond

[11] Patent Number: 5,279,124
[45] Date of Patent: Jan. 18, 1994

[54] CARTRIDGE FOR A MASTER CYLINDER ASSEMBLY FOR A FLUID PRESSURE CONTROL SYSTEM AND METHOD FOR INSTALLING A MASTER CYLINDER ASSEMBLY IN A FLUID PRESSURE CONTROL SYSTEM

[75] Inventor: William A. Aymond, Glencoe, Mo.
[73] Assignee: Cooper Industries Inc., Houston, Tex.
[21] Appl. No.: 10,388
[22] Filed: Jan. 28, 1993
[51] Int. Cl.$^5$ .............................. F15B 7/00
[52] U.S. Cl. .......................... 60/533; 60/584; 60/585; 285/23; 285/345; 251/149.4
[58] Field of Search .......... 285/18, 23, 384, 345, 285/347, 156; 251/149.4 X, 149.5, 149.6; 60/533, 584, 585

[56] References Cited

U.S. PATENT DOCUMENTS

| | | |
|---|---|---|
| 2,727,759 | 12/1955 | Elliott .............................. 251/149.6 |
| 4,407,125 | 10/1983 | Parsons . |
| 4,503,678 | 3/1985 | Wimbush . |
| 4,506,507 | 3/1985 | Wimbush . |
| 4,599,860 | 7/1986 | Parsons . |
| 4,607,670 | 8/1986 | Compton et al. ........................ 60/584 |
| 4,902,043 | 2/1990 | Zillig et al. ........................ 285/319 |
| 4,934,144 | 6/1990 | Larin ............................... 251/149.6 |
| 4,959,960 | 10/1990 | LaFountain . |
| 5,083,433 | 1/1992 | Leigh-Monstevens ............... 60/585 |

FOREIGN PATENT DOCUMENTS 598208 12/1925 France ......................... 251/149.4

Primary Examiner—Thomas E. Denion
Attorney, Agent, or Firm—Burns, Doane, Swecker & Mathis

[57] ABSTRACT

A cartridge for selectively permitting flow from a master cylinder includes a cartridge body formed with an axial passage extending from a first end to a second end of the cartridge body. A cartridge stem is disposed in the axial passage and is movable in the axial passage between a closed position, in which the cartridge stem blocks flow between the first and second ends of the cartridge body, and an open position, in which the cartridge stem permits flow between the first and second ends of the cartridge body. A method for installing a master cylinder assembly, the master cylinder assembly including a master cylinder provided with a cartridge, in a fluid pressure control system is also disclosed.

17 Claims, 4 Drawing Sheets

CARTRIDGE FOR A MASTER CYLINDER ASSEMBLY FOR A FLUID PRESSURE CONTROL SYSTEM AND METHOD FOR INSTALLING A MASTER CYLINDER ASSEMBLY IN A FLUID PRESSURE CONTROL SYSTEM

FIELD OF THE INVENTION

The invention relates to cartridges for master cylinders for fluid pressure control systems and, more particularly, to cartridges in fluid pressure control systems for selectively permitting flow to and from a master cylinder assembly.

BACKGROUND

Typical fluid pressure control systems for controlling hydraulic equipment such as vehicle brakes and clutches include a master cylinder assembly hydraulically connected to hydraulically operated components such as a slave cylinder assembly. Ordinarily, connections between the various components of a fluid pressure control system are made only after separate installation of the components, such as in the engine compartment of a vehicle. After the connections are made, it is ordinarily necessary to fill the bore of the master cylinder with hydraulic fluid and bleed air from the master cylinder. This can be a difficult, dirty, and time consuming affair. It is desirable to simplify the task of installing a master cylinder assembly in a fluid pressure control system.

OBJECTS AND SUMMARY OF THE INVENTION

It is an object of the invention to simplify the task of installation of master cylinders in fluid pressure control systems.

It is a further object of the invention to provide a master cylinder assembly for use in a fluid pressure control system that is simple to install.

It is still another object of the invention to provide a master cylinder assembly for use in a fluid pressure control system that is able to be filled with hydraulic fluid and bled of air at a remote site, such as a factory, and transported to a second site at which it can be installed in a fluid pressure control system without the need for bleeding the master cylinder assembly of air at the second site.

These and other objects are achieved in accordance with one aspect of this invention by providing a master cylinder assembly adapted to be filled with hydraulic fluid and bled of air and transported to a remote installation site. The master cylinder assembly includes a master cylinder formed with a bore and an outlet port extending from the bore. The master cylinder assembly further includes a cartridge for selectively permitting flow to and from the master cylinder. The cartridge includes a cartridge body and a cartridge stem. The cartridge body is formed with an axial passage extending from a first end to a second end of the cartridge body. The cartridge further includes a cartridge stem disposed in the axial passage. The cartridge stem is movable in the axial passage between a closed position, in which the cartridge stem blocks flow between the first and second ends of the cartridge body, and an open position, in which the cartridge stem permits flow between the first and second ends of the cartridge body. The cartridge stem is releasably retained in the closed position. The first end of the cartridge body is connected to the outlet port of the master cylinder. The second end of the cartridge body is connected to a conduit leading to other components of a fluid pressure control system. Connection of the second end of the cartridge body to the conduit moves the cartridge stem to the open position so that fluid communication between the bore of the master cylinder and other components of the fluid pressure control system, such as a slave cylinder, is established.

When the master cylinder assembly is constructed, its bore is filled with hydraulic fluid and bled of air at a remote site such as a factory. The cartridge stem is moved to the closed position and installed in the outlet of the bore. The master cylinder assembly is transported to a remote site for installation in a fluid pressure control system, the master cylinder bore fully charged with hydraulic fluid, with the cartridge stem in the closed position. At the remote installation site, the cartridge body is connected, at the second end, to a conduit leading to other components of the fluid pressure control system, and the cartridge stem is moved to the open position so that hydraulic fluid flows through the cartridge body to and from the bore of the master cylinder.

BRIEF DESCRIPTION OF THE DRAWINGS

A preferred embodiment of the present invention is described in more detail with reference to the accompanying drawings, in which like elements are identified by like reference numerals, and in which.

DETAILED DESCRIPTION

Figure 1:
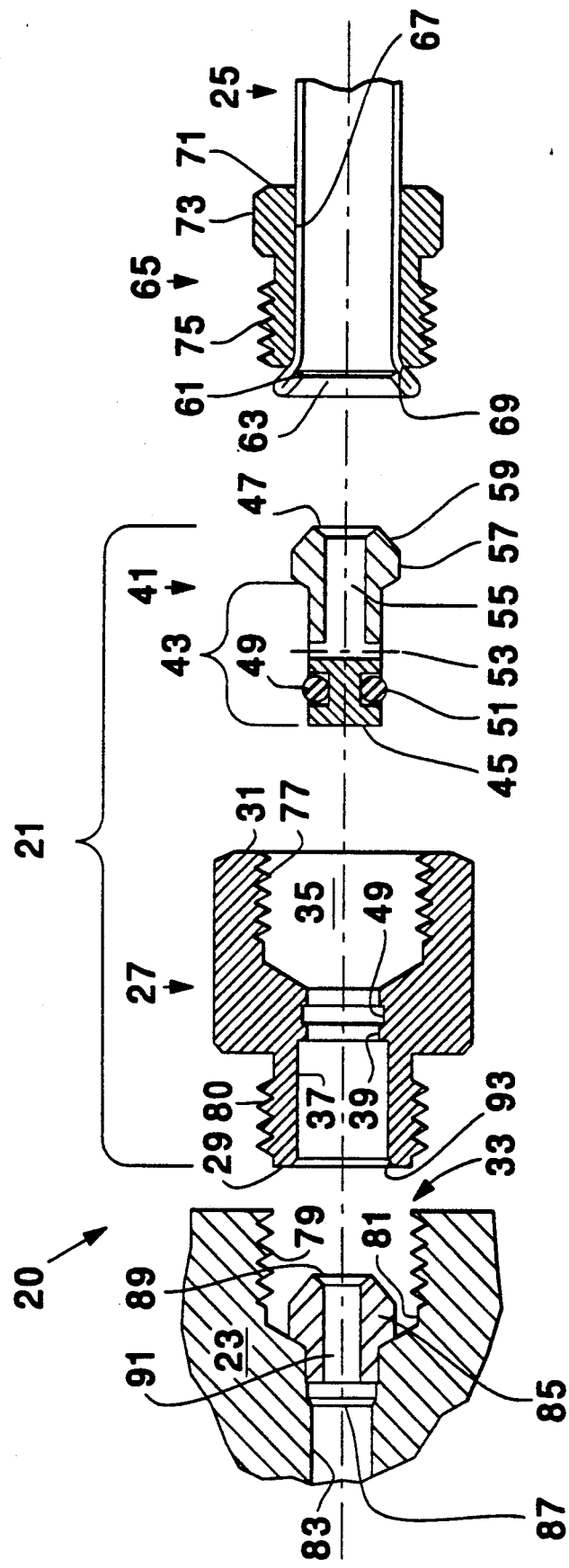
FIG. 1 is an exploded, side, cross-sectional view of a cartridge according to an embodiment of the present invention.

A master cylinder assembly 20 including a cartridge 21 for selectively permitting flow to and from a bore formed in a master cylinder 23 is shown in FIGS. 1–4. The master cylinder assembly 20, including the cartridge 21, is adapted to be connected to a conduit 25 of a fluid pressure control system 100, shown schematically in FIG. 4. The master cylinder 23 and the remaining components of the fluid pressure control system 100 are preferably of the type well-known in the art.

Figure 2:
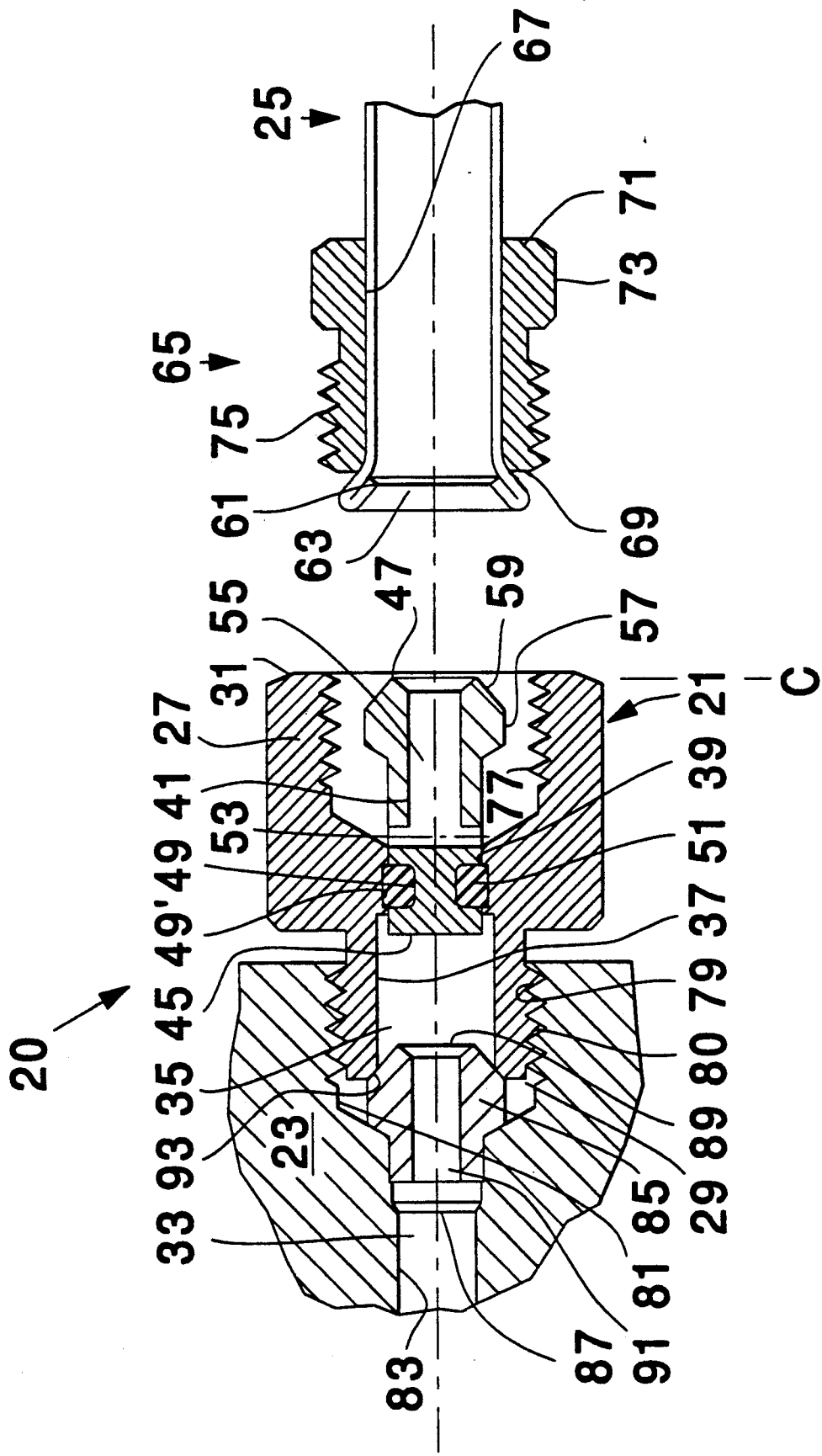
FIG. 2 is a side, cross-sectional view of a cartridge according to an embodiment of the present invention in which the cartridge is in a closed position.
Figure 3:
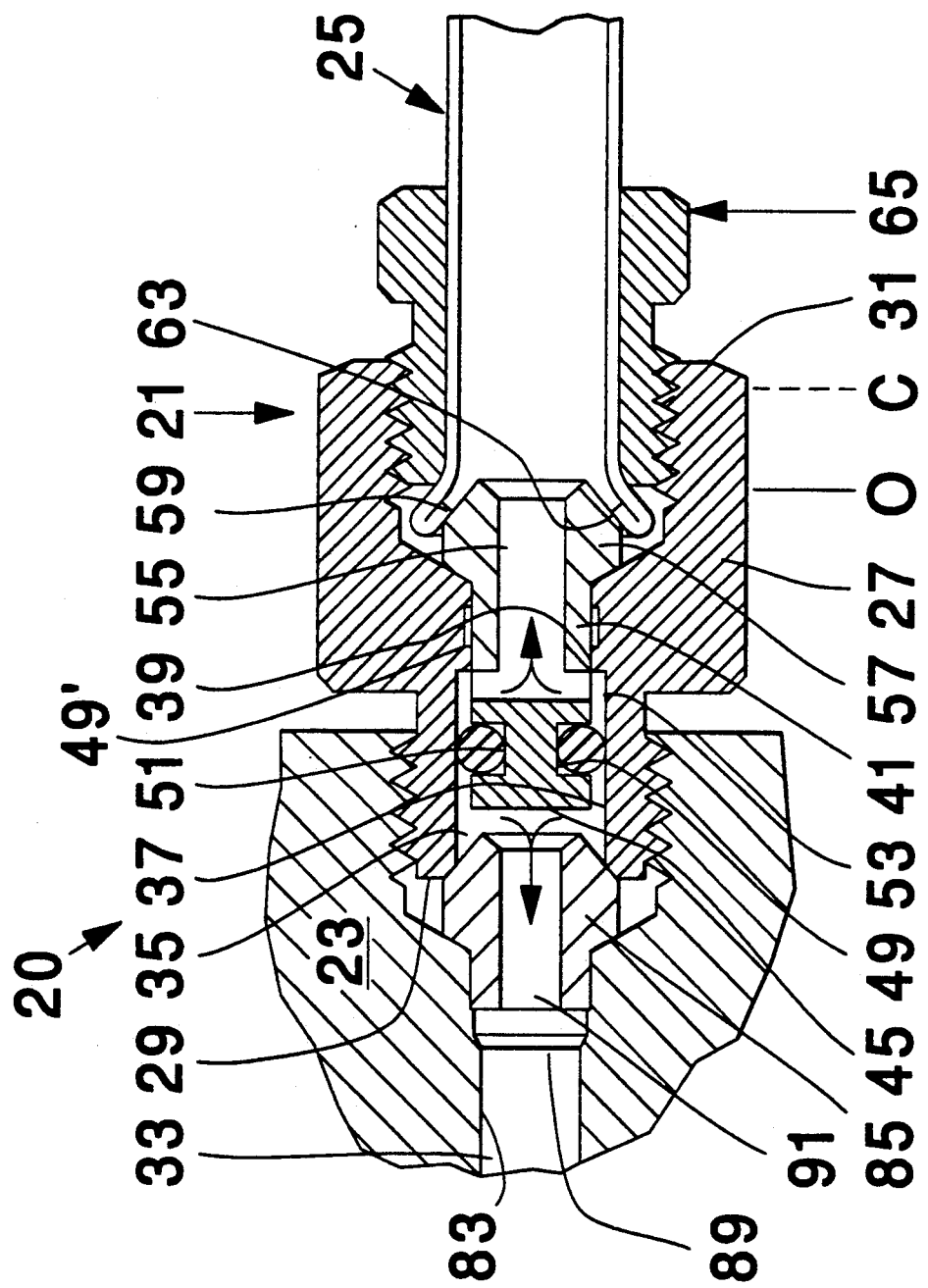
FIG. 3 is a side, cross-sectional view of a cartridge according to an embodiment of the present invention in which the cartridge is in an open position.

As seen in FIGS. 1-3, the cartridge 21 includes a cartridge body 27 having a first end 29 and a second end 31. The first end 29 of the cartridge body 27 is connected to an outlet port 33 of the master cylinder 23. The second end 31 of the cartridge body 27 is connected to the conduit 25. The cartridge body 27 is formed with a passage 35, two portions 37, 39 of which are formed with diameters of unequal size. The large diameter portion 37 of the passage 35 is formed closer to the first end 29 of the cartridge body 27 than to the second end 31, and preferably extends to the first end.

The cartridge 21 further includes a cartridge stem 41, at least a portion 43 of which is axially slidable in both the larger portion 37 and the smaller portion 39 of the passage 35 in such a manner as to selectively permit flow through the cartridge. The cartridge stem 41 has a first end 45 and a second end 47. The slidable portion 43 of the cartridge stem 41 that is axially slidable in the smaller portion 39 of the passage extends to the first end 45. The slidable portion 43 is preferably formed in a shape corresponding to the smaller portion 39 of the passage 35, such that there is only minimal clearance between the interior of the smaller portion of the passage and the exterior of the slidable portion, and such that fluid flow between the slidable portion and the smaller portion of the passage is substantially prevented.

A circumferential groove 49 for receiving an O-ring 51 is formed in the cartridge stem 41 at a point between the first and second ends 45, 47. Another circumferential groove 49' is formed on the interior of the smaller portion 39 of the passage 35, also for receiving the O-ring 51. Means for selectively holding the cartridge stem 41 in a desired axial position in the cartridge body includes the circumferential grooves 49, 49' in cooperation with the O-ring 51. When the O-ring 51 is seated in each of the grooves 49, 49', the O-ring provides some resistance to movement of the cartridge stem 41 relative to the cartridge body. However, when the O-ring 51 is compressed, such as when an axial force is applied against the first or second end 45, 47 of the cartridge stem 41, the O-ring is retained in the groove 49 and is adapted to be seated in and unseated from the groove 49' in the smaller diameter portion 39 of the passage 35. The groove 49' in the smaller diameter portion 39 of the passage 35 is preferably more shallow than the groove 49 in the cartridge stem 41 to ensure that the O-ring remains in the groove 49 in the cartridge stem 41, rather than the groove 49' in the smaller portion 39 of the passage.

A radial bore 53 is formed in the cartridge stem 41 at a point between the circumferential groove 49 and the second end 31. An axial bore 55 is formed in the cartridge stem 41 and extends from the second end 47 of the cartridge stem to the radial bore 53 such that fluid flow is permitted through the radial bore to the second end of the cartridge stem, and vice versa.

Figure 4:
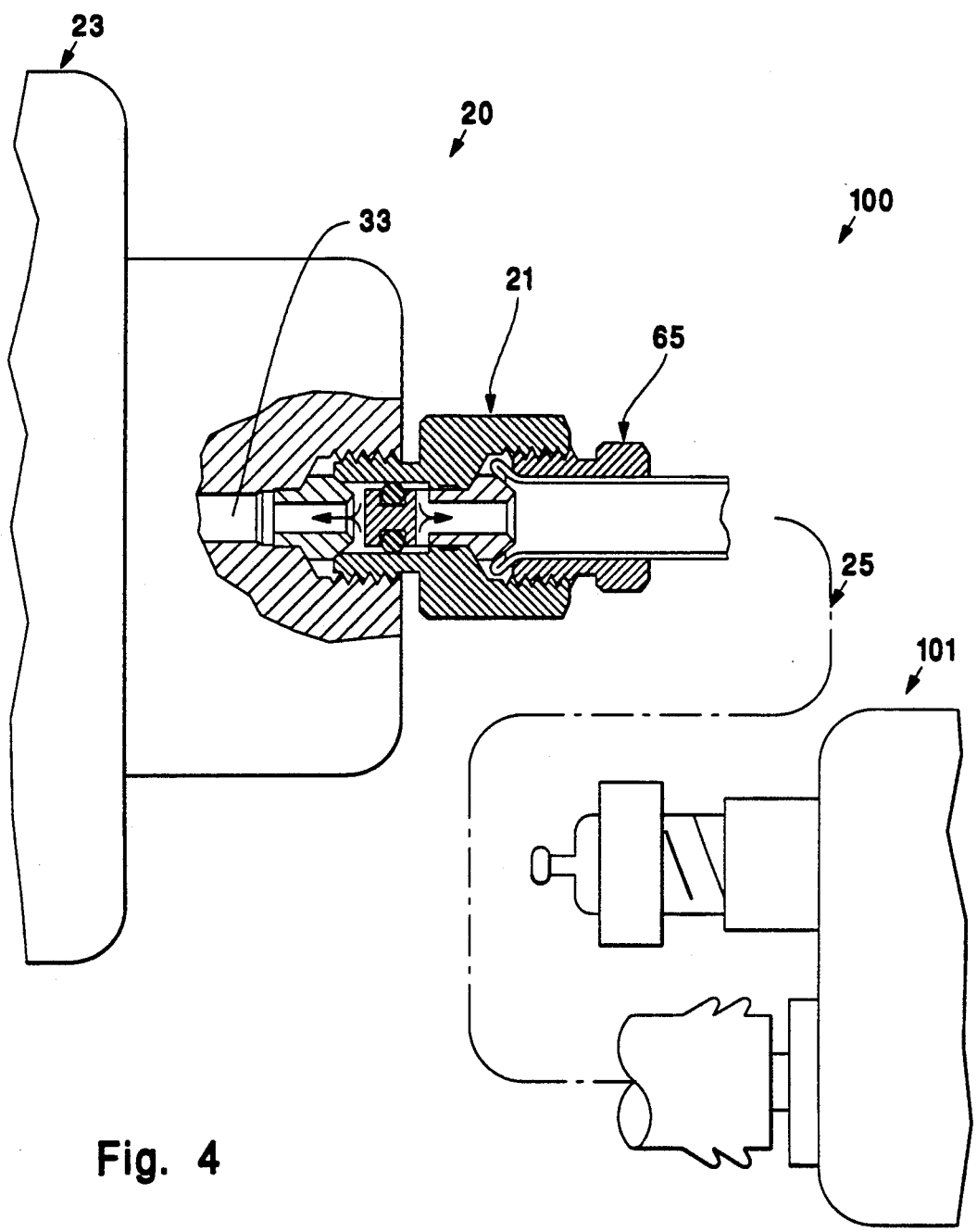
FIG. 4 schematically shows a fluid pressure control system including a master cylinder provided with a cartridge according to an embodiment of the present invention.

The slidable portion 43 of the cartridge stem 41 slides axially in the smaller portion 39 of the passage 35 between a closed position "C", seen in FIG. 2, and an open position "O", seen in FIGS. 3 and 4. In the closed position C, communication between the first end 29 of the cartridge body 27 and the second end 47 of the cartridge stem 41 is blocked by the O-ring 51 and the first end 45 of the cartridge stem. The O-ring 51 is preferably seated in both the circumferential groove 49 formed in the cartridge stem 41 and in the circumferential groove 49' formed in the interior of the smaller portion 39 of the passage 35 in the cartridge body 27 when the cartridge stem is in the closed position C. In the closed position C, the O-ring 51 seated in the grooves 49, 49' prevent fluid flow between the cartridge stem 41 and the smaller portion 39 of the passage 35 of the cartridge body 27.

When the cartridge stem 41 axially slides from the closed position C to the open position O, the O-ring 51 remains in the circumferential groove 49 in the cartridge stem and compresses in such a manner as to slide out of the circumferential groove 49' in the smaller portion 39 of the passage in the cartridge body 27. The cartridge stem 41 slides axially in the passage 35 at least to a point at which the O-ring and the radial bore 53 of the cartridge stem are moved out of the smaller portion 39 of the passage and into the larger portion 37 of the passage. In the open position O, the first end 29 of the cartridge body 27 communicates with the second end 47 of the cartridge stem 41 through the larger portion 37 of the passage 35, around the O-ring 51, through the radial bore 53 of the cartridge stem, and through the axial bore 55 of the cartridge stem.

As seen in FIGS. 1-4, the cartridge stem 41 is preferably formed with an enlarged portion 57 at the second end 47, such that the enlarged portion is larger than the smaller portion 39 of the passage 35 of the cartridge body 27 and is thereby prevented from passing through the smaller portion of the passage after the cartridge stem has moved axially in the cartridge body to the open position O. The enlarged portion 57 is preferably formed with a conical, male end portion 59 for forming a tight seal, as seen, for example, in FIG. 3, between a corresponding female end portion 63, in the shape of an inverted cone, at an end 61 of the conduit 25. The enlarged portion 57 further facilitates avoidance of accidently forcing the cartridge stem 41 too deeply into the cartridge body 27 when the cartridge 21 is assembled or when the connection to the female end portion 63 of the conduit 25 is made.

A connector 65 for securing the conduit 25 to the end portion 59 of the cartridge stem is formed with an axial passage 67 extending from a first end 69 to a second end 71 of the connector. The female end portion 63 at the end 61 of the conduit 25 is preferably rolled outwardly at the first end 69 of the connector 65 so that the connector is prevented from sliding off of the first end of the conduit. The first end 69 of the connector 65 is preferably formed in the shape of an inverted cone in a shape corresponding to the shape of the conical male end portion 59 of the cartridge stem 41 for providing uniform engagement between the cone-shaped exterior of the female end portion 63 and the first end of the connector. The remainder of the conduit 25 is disposed in the axial passage 67 and, as seen in FIG. 4, extends to a hydraulic device such as a slave cylinder 101.

As seen in FIGS. 1 and 2, the connector 65 is preferably formed, at the first end 69, with an externally threaded portion 75, and the cartridge body 27 is preferably formed, at the second end 31 of the cartridge body, with an internally threaded portion 77 for fastening together the cartridge body and the connector, as seen in FIGS. 3 and 4. The connector 65 is further preferably formed, at the second end 71, with an enlarged portion 73 to facilitate screwing the externally threaded portion 75 into the internally threaded portion 77 with a tool or by hand. The enlarged portion 73 may further be formed as a hexagon (not shown) or with a knurled exterior surface (not shown) to facilitate screwing the externally threaded portion 75 into the internally threaded portion 71.

As seen, for example, in FIG. 3, when the externally threaded portion 75 of the connector 65 is screwed into the internally threaded portion 77 of the cartridge body 27, the female end portion 63 of the conduit 25, disposed at the first end 69 of the connector, and the male end portion 59 of the enlarged portion 57 of the second end 47 of the cartridge stem 41 contact one another. As the contacting pressure between the male end portion 59 and the female end portion 63 increases, they seal against one another. The male end portion 59 of the enlarged portion 57 of the second end 47 of the cartridge stem 41 at least partially extends into the female end portion 63 of the conduit 25 to further ensure a tight seal. Further, as the first end 69 of the connector 65 moves axially into the cartridge body 27 when the externally threaded portion 75 is screwed further into the internally threaded portion 77 of the cartridge body, the female end portion 63 of the conduit is also moved axially against the cartridge stem 41 to force the cartridge stem to move axially from the closed position C to the open position O in the cartridge body. In this manner, the connector 65 ensures that the cartridge stem 41 stays in the open position O in the cartridge body 27 and does not inadvertently move to the closed position C. Further, the connector 65 ensures that, when the cartridge 21 is installed in the outlet port 33 of a master cylinder 23 as described below, undesired communication between the outlet port of the master cylinder and the second end 47 of the cartridge stem 41 does not occur before a connection is made between the second end of the cartridge stem and other components of the fluid pressure control system 100.

The outlet port 33 of the master cylinder 23 and the first end 29 of the cartridge body 27 are preferably fastened to one another in a fashion similar to that described above with respect to the connector 65 and the second end 31 of the cartridge body 27. As seen in FIGS. 1 and 2, the outlet port 33 of the master cylinder 23 is preferably formed with an internally threaded portion 79 and the first end 29 of the cartridge body 27 is preferably formed with an externally threaded portion 80 adapted to be screwed into the internally threaded portion of the master cylinder. The exterior of the cartridge body 41 is preferably formed as a hexagon (not shown) or with a knurled exterior surface (not shown) to facilitate screwing the externally threaded portion 80 of the cartridge body 27 into the internally threaded portion 79 of the outlet port 33.

The outlet port 33 of the master cylinder 23 is preferably formed with an enlarged portion 81, at least a portion of which is formed by the internally threaded portion 79, and a narrower portion 83. A seal 85 is preferably provided and has a narrow end 87 disposed in the narrow end 83 of the outlet port 33 of the master cylinder 23 and an enlarged end 89 disposed in the enlarged portion 81 of the outlet port 33 of the master cylinder. The enlarged end 89 of the seal 85 is larger than the narrow end 83 of the outlet port 33 and is therefore prevented from sliding axially into the narrow end of the outlet port. An axial passage 91 extends from the enlarged end 89 to the narrow end 87 of the seal 85.

The enlarged end 89 of the seal 85 is preferably cone-shaped and at least a portion of the cone-shaped enlarged end is receivable inside of the enlarged portion 37 of the passage 35 of the cartridge body 27 when the externally threaded portion 81 at the first end 29 of the cartridge body is screwed into the internally threaded portion 79 of the outlet port 33 of the master cylinder 23. When the externally threaded portion 81 of the first end 29 of the cartridge body 27 is screwed into the internally threaded portion 79 of the outlet port 33 of the master cylinder 23, the enlarged end 89 of the seal 85 and the first end 29 of the cartridge body 27 form a tight seal. A lip portion 93 of the first end 29 of the cartridge body 27 is preferably formed in the shape of an inverted cone in a shape corresponding to the shape of the cone-shaped enlarged end 89 of the seal 85 for receiving the cone-shaped enlarged end.

In operation, a master cylinder assembly 20 is charged by filling the bore of the master cylinder with a hydraulic fluid and bleeding air from the master cylinder assembly. The bore of the master cylinder 23 may be filled with hydraulic fluid and bled of air through the outlet port 33 prior to attachment of the cartridge 21 to the outlet port, or through another opening (not shown) formed in the master cylinder 23.

When the cartridge stem 41 is positioned in the closed position C in the cartridge body 27, the filled and bled master cylinder assembly 20 may be transported to a remote site and installed in a fluid pressure control system 100, such as is shown in FIG. 4. The conduit 25 leading to other components of the fluid pressure control system 100, such as a slave cylinder 101, is installed in the axial passage 67 of the connector 65. Preferably, the end 61 of the conduit 25 is rolled outwardly on the first end 69 of the connector 65 such that the connector is prevented from sliding off of the first end of the conduit.

The externally threaded portion 75 at the first end 69 of the connector 65 is screwed into the internally threaded portion 77 at the second end 31 of the cartridge body 27. As the female end portion 63 at the end 61 of the conduit 25 is advanced further into the internally threaded portion 77 of the cartridge body 27 when the externally threaded portion 75 of the connector 65 is screwed further into the cartridge body, the female end portion contacts with the male end portion 59 of the enlarged portion 57 at the second end 47 of the cartridge stem. As the female end portion 63 of the conduit 25 is advanced further into the internally threaded portion 77 of the cartridge body 27, the cartridge stem 41 is forced to slide axially from the closed position C, in which the O-ring is disposed in both the circumferential groove 49 in the cartridge stem and the internal circumferential groove 49' in the smaller portion 39 of the passage 35 of the cartridge body 27, such that the O-ring deforms sufficiently to slide out of the internal circumferential groove in the smaller portion of the passage of the cartridge body, and the cartridge stem is moved to the open position O, seen in FIGS. 3 and 4.

Normally, in the open position O, the enlarged portion 57 of the cartridge stem 41 abuts the smaller portion 39 of the passage and the cartridge stem is stopped from further axial movement. As the female end portion 63 of the conduit 25 is advanced axially further into the internally threaded portion 77 of the cartridge body 27, the female end portion forms a tight seal against the conical male end portion 59 of the cartridge stem 41, which is, as noted above, stopped from further axial movement. In the open position O, the outlet port 33 communicates with the second end 47 of the cartridge stem 41, and thereby also with the conduit 25 and other components of the fluid pressure control system 100, through the larger portion 37 of the passage 35 of the cartridge body 27, around the O-ring, through the radial bore 53 in the cartridge stem, and through the axial bore 55 in the cartridge stem, such that hydraulic fluid is able to flow to and from the master cylinder 23. Thus, in the open position O, flow is permitted from the first end 29 of the cartridge body 27 to the second end 31 of the cartridge body. The cartridge stem 41 is held in the open position O in the cartridge body 27, when the externally threaded portion 75 of the first end 69 of the connector 65 is screwed into the internally threaded portion 77 of the cartridge body, because of the contact between the female end portion 63 at the end 61 of the conduit 25 and the male end portion 59 of the enlarged portion 57 at the second end 47 of the cartridge stem 41.

The master cylinder assembly 20 including the cartridge 21 for selectively permitting flow to and from the master cylinder is installed in the fluid pressure control system 100 according to a method in which the master cylinder assembly is filled with hydraulic fluid. Air is bled from the master cylinder assembly 20. The filled and bled master cylinder assembly 20 is transported to a remote installation site with the cartridge stem 41 in the closed position C. The second end 31 of the cartridge body 27 is attached to a conduit 25 leading to the hydraulically operated components of the fluid pressure control system 100. The cartridge stem 41 is moved from the closed position C to the open position O such that the bore of the master cylinder 23 hydraulically communicates with the components of the fluid pressure control system 100 through the outlet port 33, through the cartridge 41, and through the conduit 25. The cartridge stem 41 is moved from the closed position C to the open position O by attaching the second end 31 of the cartridge body 27 to the conduit 25.

The reservoir (not shown) of the master cylinder 23 is usually filled with hydraulic fluid at the installation site.

While this invention has been illustrated and described in accordance with a preferred embodiment, it is recognized that variations and changes may be made therein without departing from the invention as set forth in the claims.

What is claimed is:

1. A cartridge for selectively permitting flow to and from a master cylinder, comprising:
   a cartridge body formed with an axial passage extending from a first end to a second end of the cartridge body;
   means for connecting the first end of the cartridge body to a master cylinder bore;
   means for connecting the second end of the cartridge body to a conduit;
   a cartridge stem disposed in the axial passage, the cartridge stem being movable in the axial passage between a closed position, in which the cartridge stem blocks flow between the first and second ends of the cartridge body, and an open position, in which the cartridge stem permits flow between the first and second ends of the cartridge body; the axial passage of the cartridge body being formed with a plurality of axially spaced portions, a first one of the portions being spaced from both the first and second ends of the cartridge, said first portion being between second and third portions, said first portion having a smaller diameter than the second and third portions of said axial passage, the cartridge stem having a radial bore spaced from first and second ends of the cartridge stem, the cartridge stem and having an axial bore extending from the second end of the cartridge stem to the radial bore, the radial bore of the cartridge stem being aligned with said second portion of the passage when the cartridge is in the open position and seal means between said cartridge and said first portion for preventing fluid flow through said first one of the portions when said stem is in said closed position.

2. The cartridge of claim 1, further comprising means for releasably retaining the cartridge stem in the closed position.

3. The cartridge of claim 2, wherein the releasable retaining means include a circumferential groove formed in the cartridge stem between the first end of the cartridge stem and the radial bore, a circumferential groove formed in the first portion of the passage, and an O-ring disposed in the grove in the cartridge stem.

4. The cartridge of claim 1, wherein the second end of the cartridge stem is larger than the smaller portion of the passage.

5. The cartridge of claim 1, wherein the conduit connecting means includes a connector formed with an axial passage to which a conduit is attachable, engagement means for connecting together a first end of the connector and the second end of the cartridge body, and displacement means on the connector for causing the cartridge stem to move from the closed position to the open position.

6. The cartridge of claim 5, wherein the engagement means includes an externally threaded portion formed at the first end of the connector and an internally threaded portion formed at the second end of the cartridge body, the displacement means including an abutment on said stem in position to be engaged by said connector when the first end of the connector is screwed into the second end of the cartridge body.

7. Apparatus for temporarily sealing a fluid outlet bore of a master cylinder assembly that has been filled with hydraulic fluid and bled of air, comprising:
   a master cylinder having a bore and an outlet port communicating with the bore;
   a cartridge body having an axial passage extending from a first end to a second end of the cartridge body; the first end of the cartridge body being mounted in the outlet port of the master cylinder with the bore and passage in fluid communication;
   second connection means for connecting the second end of the cartridge body to a conduit;
   a cartridge stem disposed in the axial passage, said axial passage having a first portion and a second portion and an intermediate portion between said first and second portions, said first portion being adjacent said outlet port, said cartridge stem having a length greater than said intermediate portion and having an abutment adjacent one end and having a seal element adjacent the other end, the cartridge stem being movable axially in the axial passage between a closed position, in which the seal element on the cartridge stem cooperates with said intermediate portion to block flow between the first and second ends of the cartridge body, and an open position, in which the seal element on the cartridge stem is disengaged from said intermediate portion to permit flow between the first and second ends of the cartridge body.

8. The apparatus for temporarily sealing the fluid outlet bore of a master cylinder assembly according to claim 7, wherein the second connecting means includes a threaded connector adapted for connection with a fluid conduit, the second end of the cartridge body having a screw thread arranged to receive said threaded connector, the cartridge stem having an end portion in position to be engaged by the threaded connector as the connector is threaded into the screw threads of the cartridge body, whereby the connector causes the cartridge stem to move from the closed position to the open position.

9. The master cylinder assembly of claim 8, wherein at least one of the cartridge body and the connector includes an external portion formed in the shape of a hexagon.

10. The apparatus for temporarily sealing the fluid outlet bore of a master cylinder assembly according to claim 10 wherein said cartridge stem has an internal passage extending from said one end to a location on the exterior of said stem adjacent said seal element, said seal element being between said location and said bore outlet, whereby displacement of said stem axially toward said bore outlet disengages said seal element from said intermediate portion and allows fluid to flow through said internal passage to and from said outlet bore.

11. The apparatus for temporarily sealing the fluid outlet bore of a master cylinder assembly according to claim 7 including means for maintaining said cartridge stem in said closed position.

12. The apparatus for temporarily sealing the fluid outlet bore of a master cylinder assembly according to claim 11 wherein said maintaining means includes an annular groove in said axial passage and an O-ring on said cartridge stem positioned to engage in said groove when the cartridge stem is in a closed position.

13. The apparatus for temporarily sealing the fluid outlet bore of a master cylinder assembly according to claim 8 wherein said cartridge stem has an internal passage extending from said one end to a location on the exterior of said stem adjacent said seal element, said seal element being between said location and said bore outlet, whereby displacement of said stem axially toward said bore outlet disengages said seal element from said intermediate portion and allows fluid to flow through said internal passage to and from said outlet bore.

14. The apparatus for temporarily sealing the fluid outlet bore of a master cylinder assembly according to claim 8 including means for maintaining said cartridge stem in said closed position.

15. The apparatus for temporarily sealing the fluid outlet bore of a master cylinder assembly according to claim 14 wherein said maintaining means includes an annular groove in said axial passage and an O-ring on said cartridge stem positioned to engage in said groove when the cartridge stem is in a closed position.

16. A method of installing a master cylinder assembly in a fluid pressure control system, the pressure control system including hydraulically operated components, the master cylinder assembly including a master cylinder, the master cylinder being formed with a bore and an outlet port extending from the bore, the master cylinder assembly further including a cartridge having a cartridge body formed with an axial passage extending from a first end to a second end of the cartridge body, means for connecting the first end of the cartridge body to the outlet portion of the master cylinder, means for connecting the second end of the cartridge body to a conduit, and a cartridge stem disposed in the axial passage, the cartridge stem being movable in the axial passage between a closed position, in which the cartridge stem blocks flow between the first and second ends of the cartridge body, and an open position, in which the cartridge stem permits flow between the first and second ends of the cartridge body, comprising the steps of:

filling the master cylinder assembly with hydraulic fluid;

bleeding the master cylinder assembly of air;

installing the first end of the cartridge body to the outlet port of the master cylinder;

transporting the filled and bled master cylinder assembly to an installation site with the cartridge stem in the closed position;

connecting a conduit to the second end of the cartridge body and thereby moving the cartridge stem from the closed to the open position such that the bore of the master cylinder hydraulically communicates with the components of the fluid pressure control system through the outlet port, through the cartridge, and through the conduit.

17. The method according to claim 16 wherein the connecting means between the conduit and the second end of the cartridge body includes screw threads, and wherein the connecting step includes rotating the screw threads relative to each other to engage the cartridge stem as the conduit advances relative to the cartridge body.

* * * * *